United States Patent [19]
Gregor et al.

[11] Patent Number: 5,287,039
[45] Date of Patent: Feb. 15, 1994

[54] METHOD OF HOT RESTARTING ELECTRODELESS HID LAMPS

[75] Inventors: Philip D. Gregor, Acton; Brian Dale, Lynnfield, both of Mass.

[73] Assignee: GTE Laboratories Incorporated, Waltham, Mass.

[21] Appl. No.: 626,365

[22] Filed: Dec. 12, 1990

[51] Int. Cl.⁵ ............................................ H05B 41/16
[52] U.S. Cl. ..................................... 315/248; 315/344
[58] Field of Search ............ 315/248, 344, 39, 111.51, 315/151; 313/234, 607

[56] References Cited

U.S. PATENT DOCUMENTS

| | | | |
|---|---|---|---|
| 4,383,203 | 5/1983 | Stanley | 315/248 |
| 4,451,765 | 5/1984 | Gray | 315/248 |
| 4,456,891 | 1/1984 | Fowks | 315/344 |
| 4,631,449 | 12/1986 | Peters | 315/248 |
| 4,751,434 | 1/1988 | Helling | 315/248 |

Primary Examiner—Eugene R. LaRoche
Assistant Examiner—A. Zarabian
Attorney, Agent, or Firm—Victor F. Lohmann, III; William E. Meyer

[57] ABSTRACT

The present invention describes an apparatus and method for shutting off an electrodeless lamp such that it can be restarted instantaneously at any time. The method involves reducing the applied microwave power in a controlled way the moment the lamp is turned off. The reduction of power is accomplished by modulating the microwave power with an ever decreasing duty factor or a decrease of analog power. This reduction in power results continually in reduced light output and lamp cooling while maintaining partial ionization of the lamp fill. Circuitry to accomplish this is also presented.

7 Claims, 10 Drawing Sheets

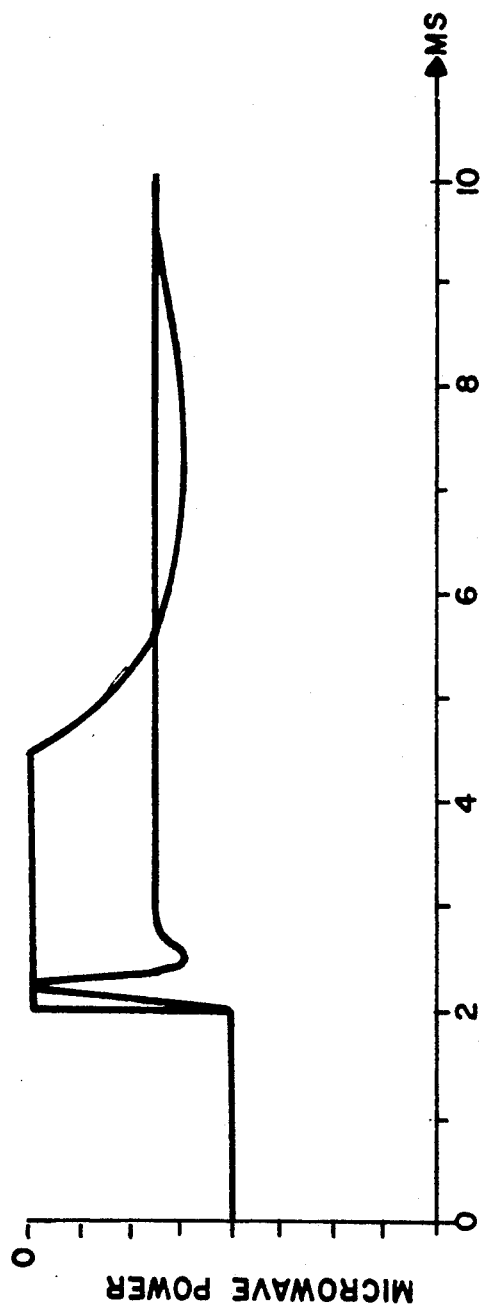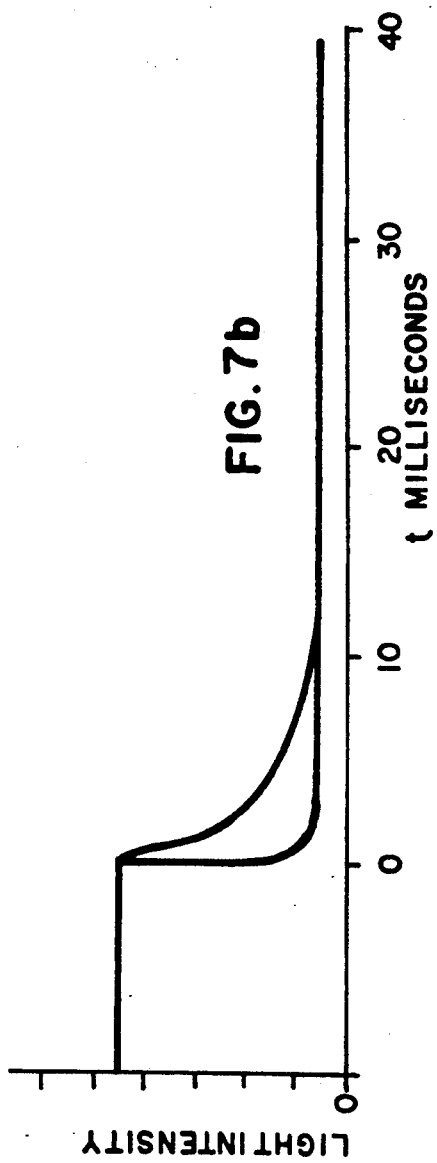

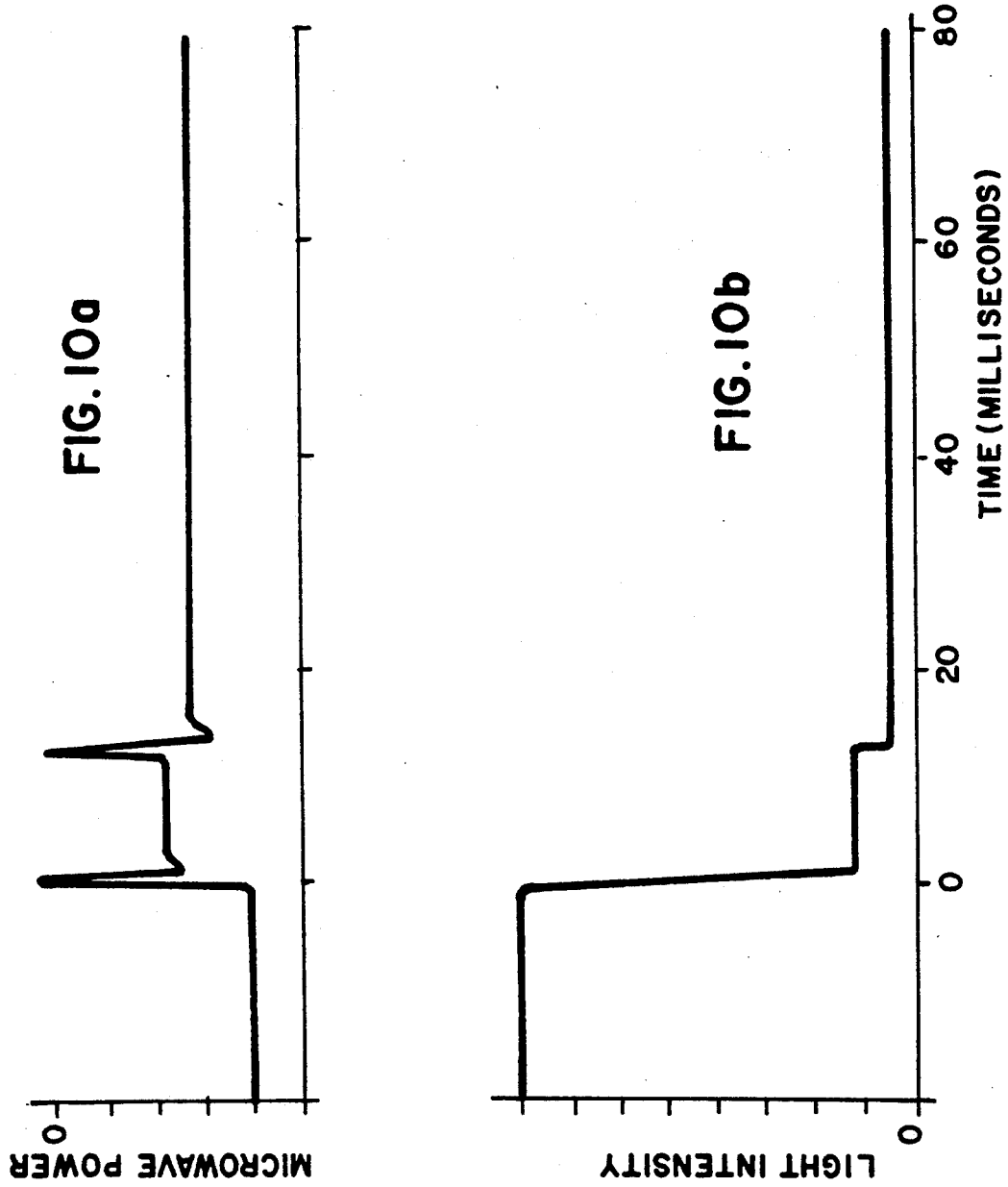

METHOD OF HOT RESTARTING ELECTRODELESS HID LAMPS

BACKGROUND OF THE INVENTION

This invention relates to restarting electrodeless high intensity discharge (HID) lamps and more particularly, to a method and apparatus for shutting down electrodeless HID lamps so that they may be restarted instantaneously.

During normal operation of an electrodeless HID lamp, continuous microwave power is supplied to the lamp. Generally electrodeless discharge lamps are operated by a microwave field with a constant power level. Breakdown of the hot gas within the electrodeless discharge vessel is achieved by capacitively coupling high voltage pulses through the quartz wall. Under fixed microwave power and high voltage pulse conditions, the discharge will fail to restart during well defined intervals in the cooling phase even though gaseous breakdown occurs within the vessel.

Although high voltage pulses can in some circumstances, be used to restart electrodeless lamps there are problems associated with such methods. These problems include surface breakdown around the arc tube from the high voltage pulses and the safety concern of the high voltage source. The present invention discloses a method and apparatus for restarting hot electrodeless lamps without using high voltages.

SUMMARY OF THE INVENTION

The present invention describes a method and apparatus for shutting off an electrodeless lamp in a manner that allows for instantaneous restart. The method involves reducing the applied microwave power in a controlled way when the lamp is turned off. The reduction in power results in continually reduced light output and lamp cooling while maintaining ionization of the lamp fill.

The circuitry to accomplish this controlled shut down comprises a photodiode which senses visible radiation from the electrodeless lamp and provides an output signal. The output signal is amplified by an inverting operational amplifier and subsequently coupled to a second inverting operational amplifier. A current source is also coupled to the second operational amplifier which provides a steadily increasing negative current. The output of this second operational amplifier is coupled to a switch means which controls the microwave power applied to the electrodeless lamp.

BRIEF DESCRIPTION OF THE DRAWINGS

FIG. 7($a$-7($b$) shows the short-term response of the control circuit of FIGS. 5 and 6;

FIG. 10 shows the light output response of the control circuit of FIG. 9;

For a better understanding of the present invention together with other objects, advantages and capabilities thereof, reference is made to the following description and appended claims in connection with the above described drawing.

DETAILED DESCRIPTION OF THE PREFERRED EMBODIMENTS

In the normal operating mode of an electrodeless HID lamp, continuous microwave power is supplied to the lamp. In the present invention the hot restart condition is achieved through controlled reduction of the microwave power at the time at which the lamp is switched off.

One way to control the power reduction is to modulate the microwave power between on and off states at megahertz frequencies with a decreasing duty factor. A significant initial drop in light intensity can be obtained, followed by a more gradual reduction as the lamp cools. With the proper power reduction rate, a discharge is maintained during the entire cooling period and is returned to its fully conducting state each time the microwave power is restored. In this mode of lamp shut down the rate of power reduction, and therefore time required to fully extinguish the lamp, will depend on the cooling rates of the quartz vessel and interior gas. If the duty factor is reduced too abruptly during cool down the lamp will extinguish.

An alternative approach to controlled power reduction is to use optical sensing and electrical feedback to an analog microwave power switch to maintain the light output at a desired level. This pre-programmed desired light level is arranged to have an initial rapid drop followed by a gradual reduction to the level typical for the glow discharge. When this circuit is placed in control of the lamp, the power level will be reduced in a way consistent with the required reduction in light level. Once the discharge has passed into the glow state, the microwave power is switched off. Alternatively, the circuit can provide power at a level to maintain an arc permanently; albeit at a low light level. The lamp is then started when full power is applied. This method has the advantage of avoiding the transition from the arc to the glow which is the region of instability in some lamps.

Figure 1:
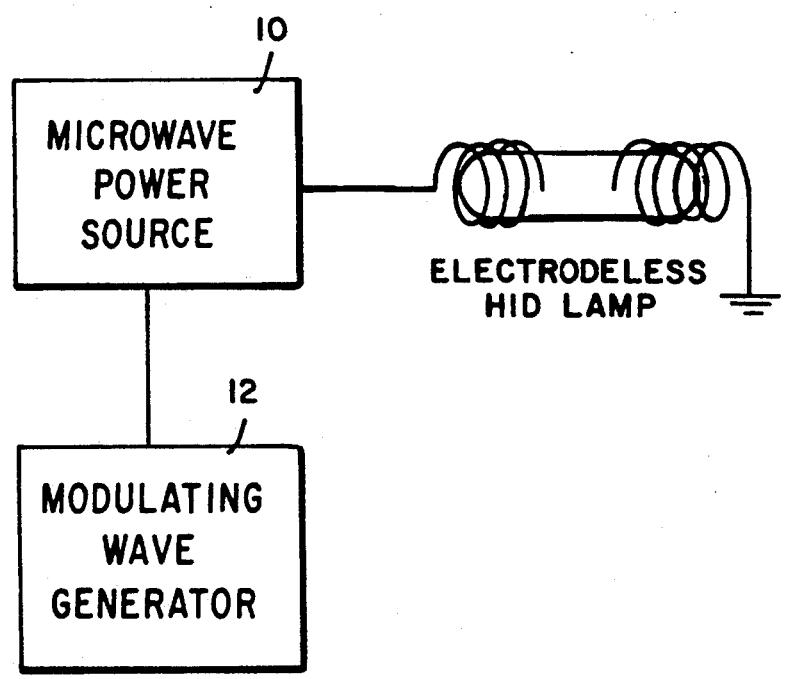
FIG. 1 shows a block diagram for electrodeless lamp operation and hot restart capability.

FIG. 1 shows a block diagram for electrodeless lamp operation and hot restart capability for the present invention. In the experimental setup, a pin diode switch (not shown) within the microwave power source 10 is used to interrupt the microwave signal provided to the amplifier by the microwave oscillator 12. Alternatively the pin diode switch could be eliminated and interrupt modulation could be applied to the oscillator power source. In either case, microwave power delivered to the lamp is zero, during the interruption. A Wavetek function generator is used in the experimental setup to switch the pin diode during lamp cooling. During normal operation the pin diode switch is always closed.

To explore the capabilities of this mode of hot restart, the output from the function generator was set up to provide a constant period (e.g. 240 ns.) with interrupted power over a wide frequency range. In this way the lamp on-time, and thus the duty factor was varied by changing the waveform frequency output from the function generator. By slowly increasing the frequency on the generator, the power delivered to the lamp decreases and the lamp cools. With careful frequency adjustment the lamp was brought down from full arc operation at 26 W to a diffuse cool discharge operating at 70 mW in approximately 60 seconds. The lamp restarts to full power at any point during the shut down phase if continuous microwave power output is reestablished. After the cool diffuse discharge is attained in the shutdown process the lamp may be completely extinguished and subsequently restarted at any moment thereafter as a cold start perhaps with the assistance of UV illumination. High voltage pulses are not required for cold lamps due to the low pressure buffer gas mixture used in these lamps.

Figure 2:
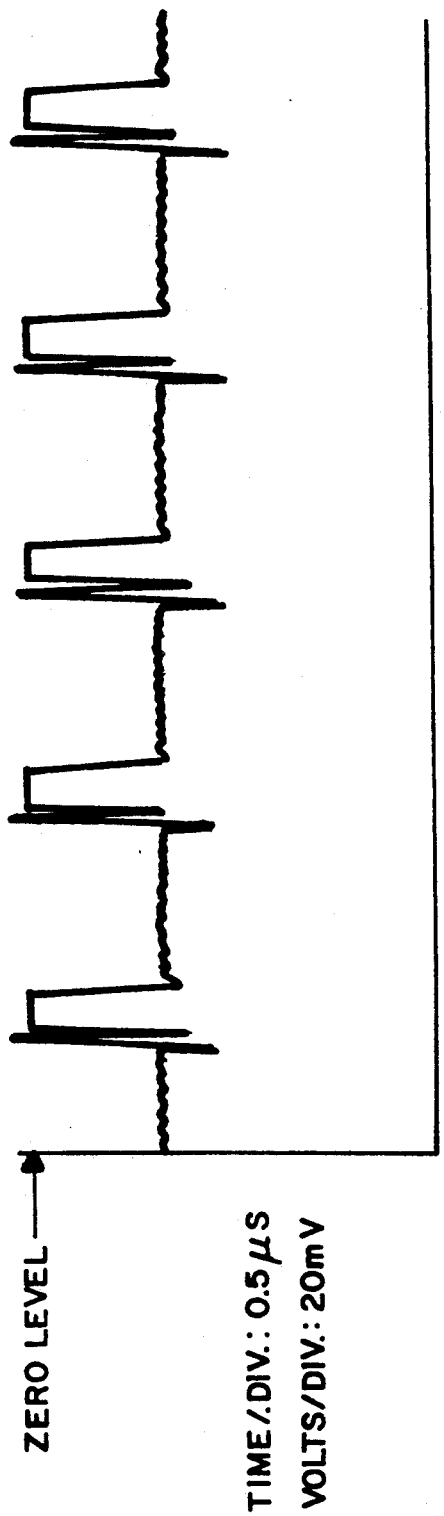
FIG. 2 shows the forward power during lamp shutdown using pulsed microwave power.
Figure 3:
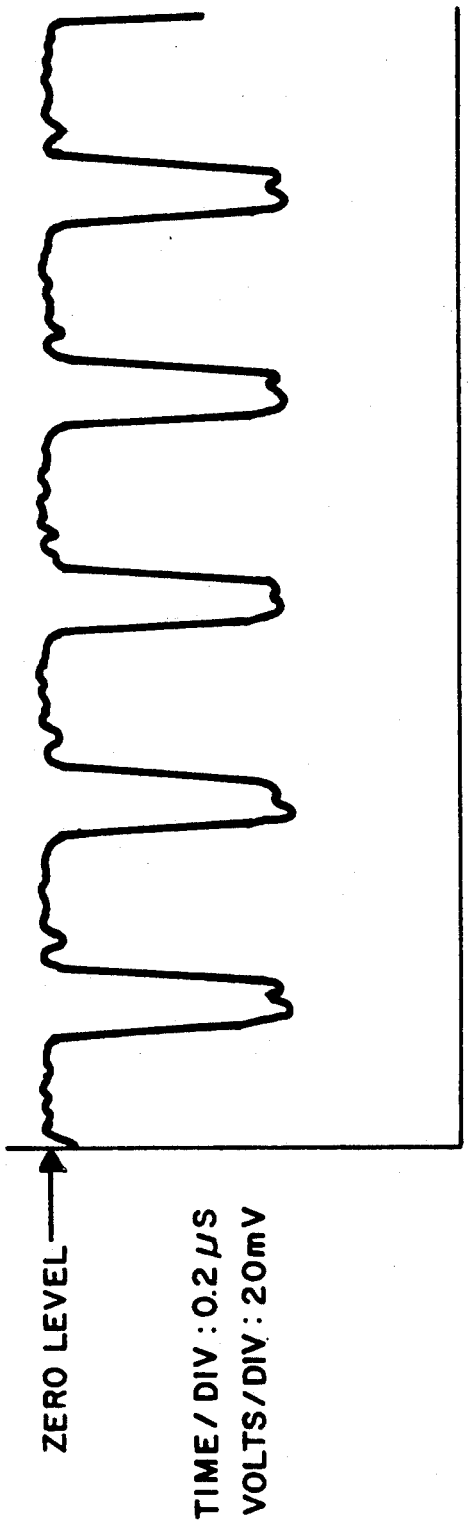
FIG. 3 shows the forward power during lamp shutdown using pulsed microwave power.

FIGS. 2 and 3 show the power delivered to the lamp at different duty factors during a lamp shutdown. The high level represents the amount of time the power is off (this is 240 nanoseconds for both cases) and the lower levels represent the period of time power is being delivered to the lamp. For FIG. 2 the on time is 690 nanoseconds and for FIG. 3 the on time is 96 nanoseconds. At the duty factor shown in FIG. 2, the lamp dims considerably in comparison to the continuous power operating mode.

Figure 4:
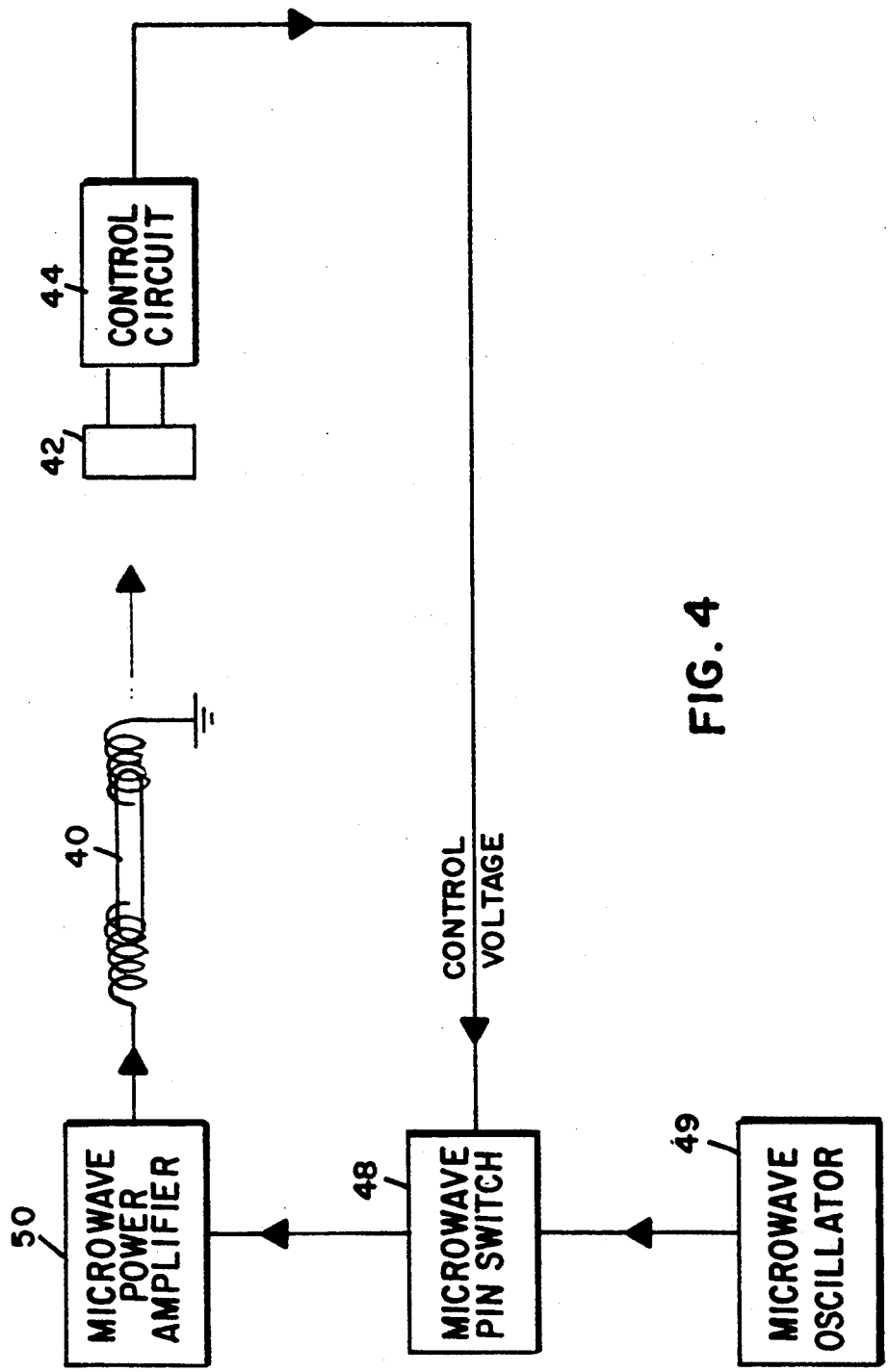
FIG. 4 shows a block diagram of an electronic circuit used to control the lamp during the cool-down phase.

Following satisfactory laboratory demonstration of the concept as described above and shown in FIGS. 2 and 3, a simple electronic circuit was built to control the lamp during the cool-down phase. A block diagram of the system is shown in FIG. 4. This consists of a lamp 40, a photocell 42 to sense the light level, an electronic control circuit 44 which amplifies the photocell output and provides a DC voltage to a PIN diode switch 48, and the microwave power source 50. The PIN diode switch 48 is placed between the microwave oscillator 49 and power amplifier 50. Although primarily intended as a digital switch, the output of the switch 48 is a sufficiently gradual function of the input control voltage to allow it to function satisfactorily as an analog power control device. The performance of this switch is such that maximum power is supplied if a control voltage of $-7$ volts is applied. The power falls slowly at first as the control voltage is increased, then more rapidly as the control voltage exceeds $-4$ volts. The power becomes essentially zero above $-2.5$ volts.

The lamp used in the experiments had a length of 10 mm, an outer diameter of 4 mm and an inner diameter of 3 mm. The mercury content within the lamp was 0.89 mg. The buffer gas within the lamp was neon at 20 torr pressure. In addition, 0.26 mg of $NaScI_4$ was added to the fill which was comprised of a 12:1 molar ratio of NaI and $ScI_3$. The dimensions and fill characteristics of the lamp affect its response to the electronic control circuit described below.

Figure 5:
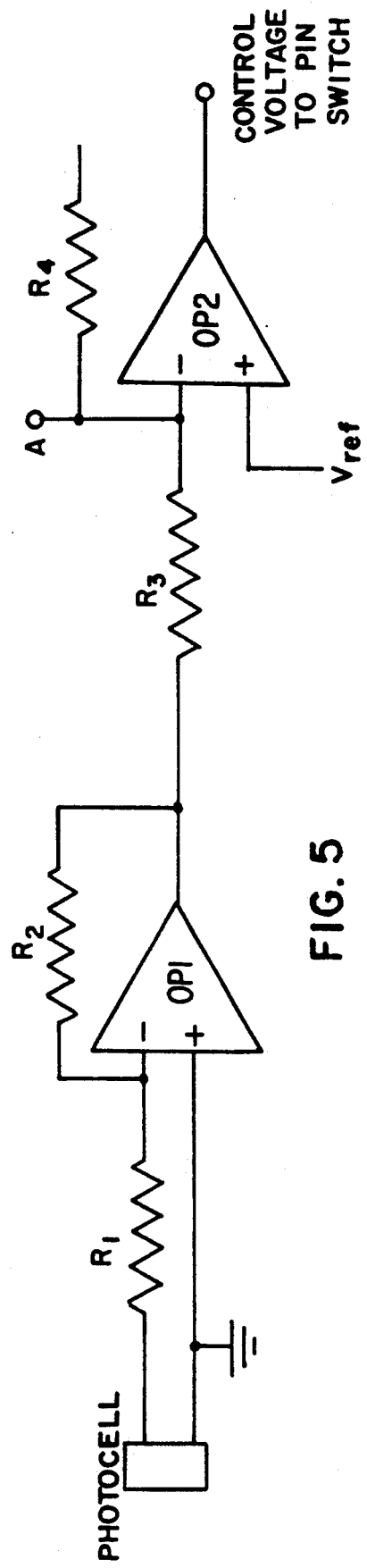
FIG. 5 shows an electronic control circuit for practicing the present invention.

The important features of the electronic control circuit can be understood with reference to FIG. 5. The output from the photocell is supplied to the inverting input of the operational amplifier OP1, with the non-inverting input connected to ground. The gain of this amplifier stage is determined by the ratio of resistors R2/R1. The output from this first stage is fed to the inverting input of a second stage of amplification OP2. In this case, the non-inverting input is connected to a negative reference potential $-V_{ref}$. The gain of this second stage is the ratio R4/R3. In the absence of any signal from the photocell, the output from OP1 will be zero, while that from OP2 will be $-V_{ref}$ multiplied by (R4/R3). This is arranged to be about $-7$ volts. When this voltage is applied to the PIN diode switch, maximum power is delivered from the microwave power source to the lamp. As the light level rises, the output from the photocell rises. This change in input signal is then amplified by OP1 and OP2, providing an increasing (less negative) signal to the switch. This decreases the power to the lamp, and at some light level the system comes into equilibrium. The circuit will then continue to control the light level at this value indefinitely.

In practice, the light level is initially at its maximum value and is not under the control of this circuit. At the moment when the lamp is switched off, the circuit is put into control. Since it senses a high light level its output voltage rises to a positive value, thereby cutting off microwave power to the lamp. As the light level drops, the output voltage from the circuit becomes increasingly negative. At some point the PIN diode switch allows microwave power to be re-applied to the lamp, which now is controlled at the desired light level. This light level, which applies to the situation immediately after turn-off, is set as low as is practicable subject to constraints to be discussed later. A typical value is 10% of the continuous level before switch-off.

Continuous cooldown of the lamp to the glow condition is achieved by feeding a gradually increasing negative current into the inverting input of OP2, designated as point A in FIG. 5. This current is in the same direction as photocurrent originating from the photocell and amplified by OP1 before being fed to the same point. Therefore, OP2 interprets this current as being due to increased light intensity, and decreases power to the lamp in order to maintain control at what it believes to be a constant light level. The net result is a steady decrease in light level until the lamp enters the glow state. At this point a simple timer circuit can be used to remove power to the lamp and to disable the control circuit in preparation for the next application of power to the lamp. Alternatively, the lamp can be maintained so that the arc is on permanently in a low power mode in which little light is emitted.

Figure 6:
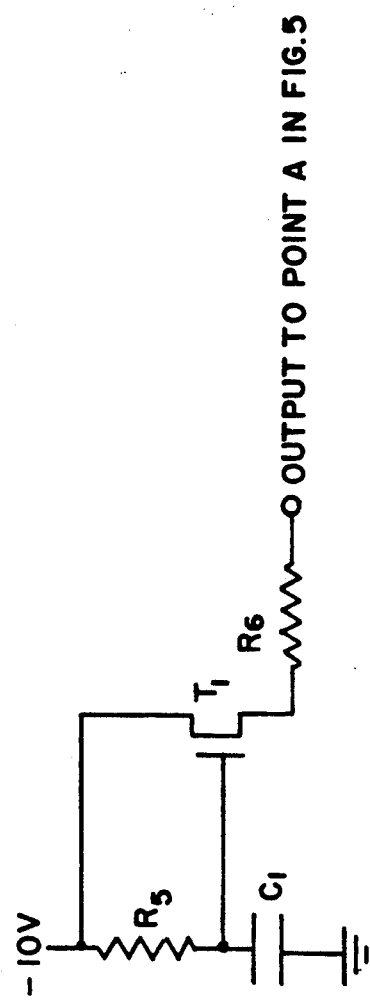
FIG. 6 shows a current source for supplying a signal to the control circuit of FIG. 5.

The negative current supplied to point A is generated by the circuit shown in FIG. 6. This consists of a simple capacitor charging circuit with a time constant given by R5 and C1, which supplies a potential to the gate of the P-channel FET T1. This is operated as a source-follower with the output supplied through resistor R6 to point A in FIG. 5. Too rapid cooldown can result in lamp instability. A cooling time of about 2 minutes is adequate to ensure successful operation. Since the insulated gate of transistor T1 will store charge for long periods of time, it is necessary for the timer circuit to discharge this capacitor before subsequent use.

Figure 8A:
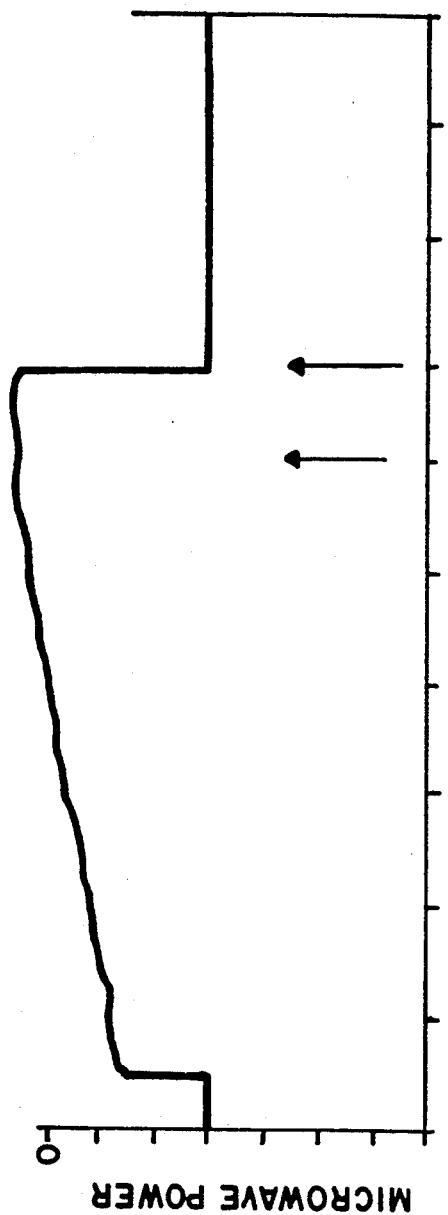
FIG. 8($a$)–8($b$) shows the long term response of the control circuit of FIGS. 5 and 6.
Figure 8B:
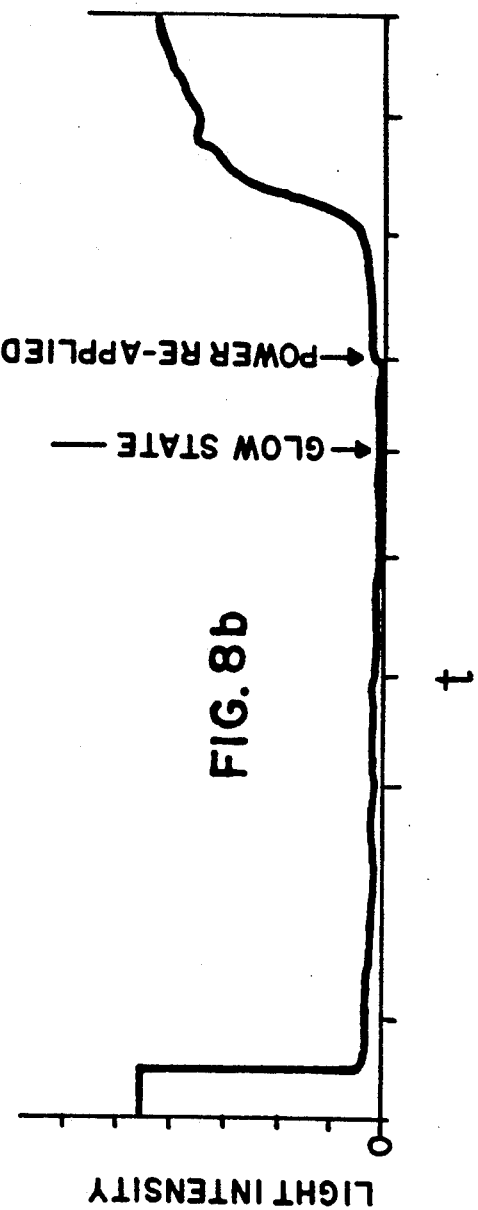

FIG. 7(a) and 7(b) shows the short-term response of the control circuit. The upper trace (FIG. 7(a)) represents the microwave power applied to the lamp with zero at the top and power increasing in the downwards direction. The scale is in arbitrary units. The expanded scale shows that power is re-applied about 2.5 ms after turn-off in this case. The lower trace (FIG. 7(b)) represents the light level, which is brought under control at about 13% of the initial level after about 2.5 ms. The traces labeled a and b on each trace of FIG. 7(a) and (b)

refer to the time scale used. The b traces use the 7(b) time scale (10 ms per division) and the a traces use the 7(a) time scale (1 ms per division). FIG. 8(a) and 8(b) show the microwave power decreasing (FIG. 8(a)) and the light level decreasing (FIG. (b)) over a period of two minutes, after which the lamp is in the glow state.

A critical factor affecting the performance of this circuit is the "deionization time" of the lamp-power supply system. Deionization time is defined here to be the maximum time that the microwave power may be removed while ensuring that the lamp will re-ignite when the power is re-applied. This is critical since, as explained previously, the circuit initially removes microwave power and then restores it when the light level has fallen to the predetermined value. However, the decay time of the light is not negligible and has a noticeable tail as the light is reduced to a low value. The consequence is that, for a given deionization time, the initial controllable light level after turn-off is limited to values such that the decay time is shorter. The deionization time is a function of the mercury pressure and chemical additives within the lamp, and of the effectiveness of the structure that couples microwave power into the lamp, in addition to the power level and frequency output of the power source. Typical times range from 0.5 ms to 3 ms. The decay time of the full spectrum of visible light is in the region of 2 ms. Some advantage may be gained by utilizing the mercury line at 5770A (isolated by an appropriate filter) as the input to the photocell. This has the advantage of a considerably faster decay (about 0.5 ms) which allows for control at a lower level of this light (4% of the full on-state light has been achieved). However this advantage is off-set to some degree by the fact that the relationship between the full visual spectrum intensity and that of the 5770 line is not simple, and the reduction in the full spectrum light is less than that of the 5770 line.

Figure 9:
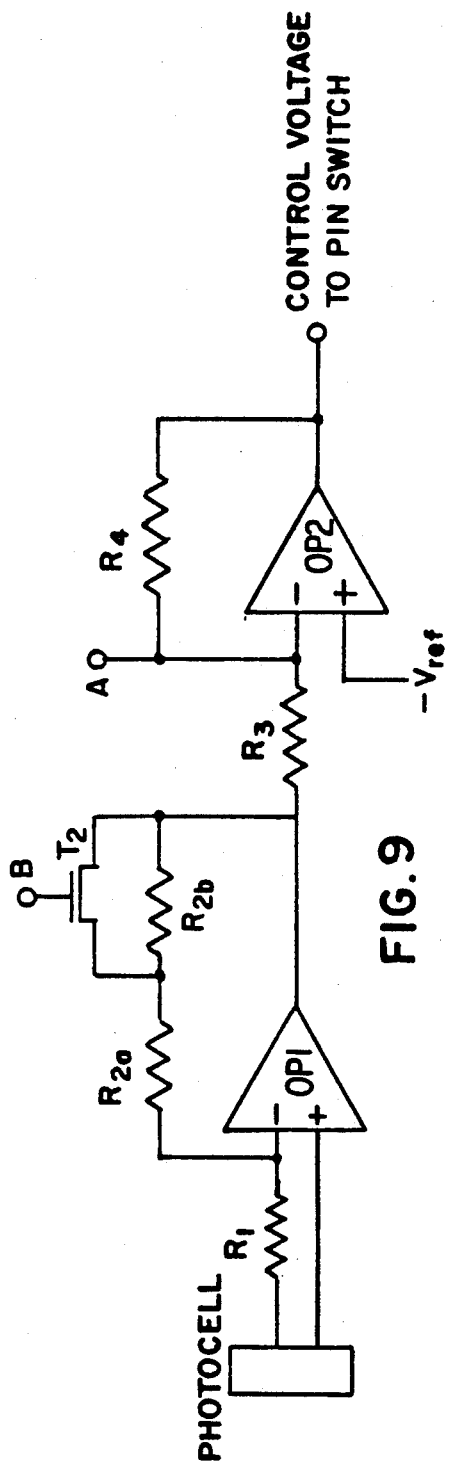
FIG. 9 shows an alternative electronic control circuit for practicing the present invention.
Figure 11:
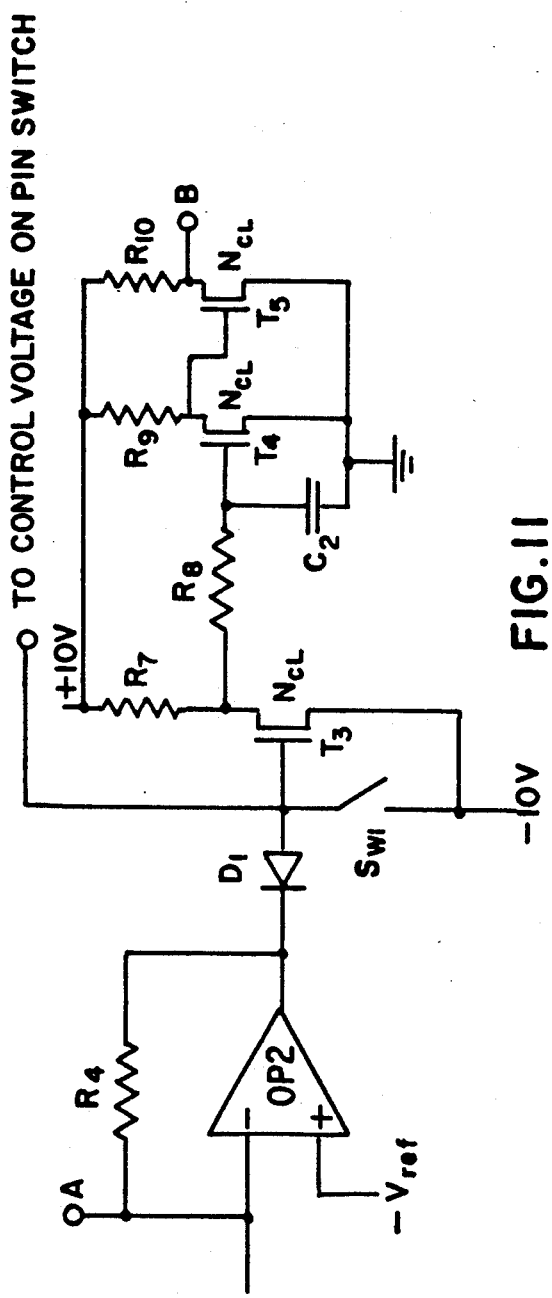
FIG. 11 shows the switch turn-off circuit for transistor $T_2$ used in FIG. 9.

An alternative solution to this problem is to use a two-stage reduction in light level rather than a single stage. This is accomplished by the circuit shown in FIG. 9. The essential difference is the splitting of resistor R2 in FIG. 5 into two parts, R2a and R2b. Resistor R2b is initially shorted by the P-channel transistor T2. When the lamp is turned off, the gain of the first stage of the control circuit is set by the ratio R2a/R1. This sets the controlled light level at a value such that the decay time is comfortably less than the deionization time. After a period of time adequate for the circuit to assume control (a few tens of milliseconds), transistor T2 is switched off, allowing R2b to enter the circuit. This increases the circuit gain of the first stage to (R2a+R2b)/R1, and decreases the controlled light level accordingly. Because of the initial rapid drop of light intensity from the first control level, it is possible to achieve a substantial light intensity reduction at this second stage while still maintaining the decay time less than the deionization time. Substantial overall improvement in initial light reduction, while still maintaining stable operation, is achieved by using this two-stage process. In FIG. 10, an overall decrease in light level to about 5% of the original value was achieved within 30 ms of the time of turn-off. A circuit which delays the switch-off of transistor T2 and thus provides the two-stage turn-off is shown in FIG. 11. When the lamp is in its fully on state, switch SW1 is closed, which connects the PIN switch directly to −10 volts. Diode D1 protects the output of OP2 from this negative voltage. In this condition, transistors T3 and T5 are off, transistors T4 and T2 are on and resistor R2b is shorted. When the lamp is to be turned off, SW1 is opened and the lamp is placed under the control of the circuit. The output of OP2 swings positive, temporarily cutting off power to the lamp. Co-incident with this, transistor T3 is turned on. After a delay set by the time constant R8 multiplied by C2, T4 is turned off, T5 on and T2 off. This latter step inserts resistor R2b into the circuit and initiates the second stage of the light reduction as previously described.

While it is possible to extend this concept to a multi-stage reduction in light level, the benefits become progressively smaller for increased number of stages.

Figure 12:
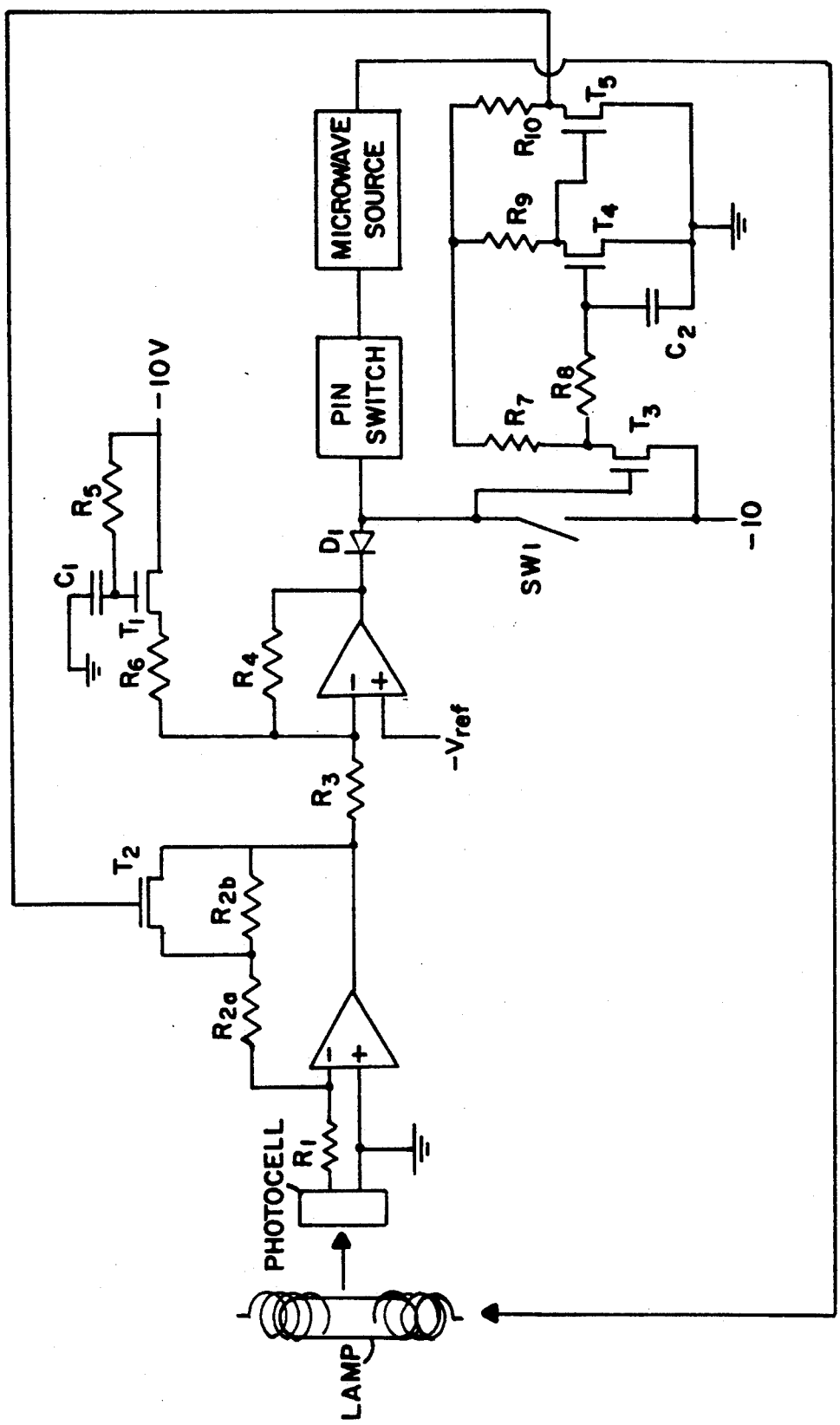
FIG. 12 shows a complete control circuit for practicing the present invention.

A diagram of the complete circuit is shown in FIG. 12.

While there has been shown and described what are at present considered the preferred embodiments of the invention, it will be obvious to those skilled in the art that various alterations and modifications may be made therein without departing from the scope of the invention.

What is claimed is:

1. A method of operating a microwave powered arc discharge electrodeless lamp switched to an off condition comprising:
   interrupting microwave power supplied to the lamp at a frequency to cause a decrease in optical emission of the lamp and for the lamp fill to remain partially ionized.
   shutting off microwave power to the lamp after a predetermined time.

2. A method of operating an arc discharge electrodeless lamp switched to an off condition comprising:
   interrupting microwave power supplied to the lamp at a frequency lowering the duty factor wherein the optical emission of the lamp is decreased and the lamp fill contained in the lamp remains partially ionized thereby allowing the lamp to cool.

3. The method according to claim 2 wherein the duty factor is lowered to a predetermined minimum level so that the lamp remains ionized at a low level after cooling.

4. An apparatus for shutting off an arc discharge electrodeless lamp comprising:
   a photodiode capable of sensing visible radiation and generating a signal corresponding to the visible radiation;
   signal amplification means coupled to the photodiode and capable of generating a DC signal in response to a signal from the photodiode;
   switch means coupled to the signal amplification means wherein the switch means provides an analog signal in response to the DC signal; and
   A microwave power supply which supplies power to the electrodeless lamp and is coupled to said switch means so that power to the electrodeless lamp is reduced in response to the analog signal from said switch means.

5. The apparatus of claim 4 wherein the signal amplification means comprises:
   a first operational amplifier wherein the signal provided from the photodiode is coupled to the inverting input, said first operational amplifier providing an output signal;
   a second operational amplifier wherein the output of the first operational amplifier is coupled to the inverting input of the second operational amplifier said second operational amplifier providing an output signal which is coupled to said switch means; and a current source coupled to the inverting input of the second operational amplifier, said current source providing a gradually increasing negative current.

6. The apparatus of claim 5 wherein said current source comprises:

a capacitor charging circuit having a capacitor and a resistor coupled to a negative voltage; and a p-channel field effect transistor which receives a potential from said charging circuit, said field effect transistor providing a current output.

7. The apparatus of claim 4 wherein the switch means comprises a PIN diode switch.

* * * * *